United States Patent
Morton

(10) Patent No.: US 10,698,601 B2
(45) Date of Patent: Jun. 30, 2020

(54) SECOND TOUCH ZOOM CONTROL

(71) Applicant: PTC Inc., Boston, MA (US)

(72) Inventor: Michael S. Morton, Lyme, NH (US)

(73) Assignee: PTC Inc., Boston, MA (US)

( * ) Notice: Subject to any disclaimer, the term of this patent is extended or adjusted under 35 U.S.C. 154(b) by 0 days.

(21) Appl. No.: 15/801,453

(22) Filed: Nov. 2, 2017

(65) Prior Publication Data

US 2018/0121077 A1     May 3, 2018

Related U.S. Application Data

(60) Provisional application No. 62/416,201, filed on Nov. 2, 2016.

(51) Int. Cl.
| | | |
|---|---|---|
| *G06F 3/0485* | (2013.01) | |
| *G06F 3/0482* | (2013.01) | |
| *G06F 3/0488* | (2013.01) | |
| *G06F 3/01* | (2006.01) | |
| *G06F 3/041* | (2006.01) | |

(52) U.S. Cl.
CPC .......... *G06F 3/04883* (2013.01); *G06F 3/017* (2013.01); *G06F 3/0416* (2013.01); *G06F 3/0485* (2013.01); *G06F 2203/04104* (2013.01); *G06F 2203/04806* (2013.01); *G06F 2203/04808* (2013.01)

(58) Field of Classification Search
CPC .................. G06F 2203/04806; G06F 3/04883
See application file for complete search history.

(56) References Cited

U.S. PATENT DOCUMENTS

| | | | |
|---|---|---|---|
| 7,844,915 B2 | 11/2010 | Platzer et al. | |
| 8,239,784 B2 | 8/2012 | Hotelling et al. | |
| 8,350,822 B2 | 1/2013 | Yang et al. | |
| 8,766,928 B2 | 7/2014 | Weeldreyer et al. | |
| 9,024,895 B2 | 5/2015 | Yang et al. | |
| 9,098,182 B2 | 8/2015 | Migo et al. | |
| 9,128,609 B2 | 9/2015 | Wei-Wen et al. | |
| 9,716,825 B1 * | 7/2017 | Manzari | H04N 5/23216 |
| 2006/0026521 A1 * | 2/2006 | Hotelling | G06F 3/0418 |
| | | | 715/702 |

(Continued)

OTHER PUBLICATIONS

Burger, Single Touch Zoom Gestures on a Mobile Device, Sep. 30, 2010, online at nealbuerger.com/wp-content/uploads/2009/02/SingleTouchZoomGestures.pdf.

*Primary Examiner* — Rayeez R Chowdhury
(74) *Attorney, Agent, or Firm* — Clocktower Law; Erik J. Heels; Michael A. Bartley

(57) ABSTRACT

A second touch zoom solution allows maintaining selection control, and movement of a selection point, during zoom operations not possible through traditional pinch-zoom. A first finger touch to a touch screen establishes a hot spot, selection, or one-finger gesture. Before the first finger is lifted from the touch screen, a second finger is placed on the screen and serves as a zoom control. Dragging the second finger away from the first zooms in; toward the first zooms out. Dragging the first finger does not affect the zoom, even if the motion changes the difference between the two fingers. When the second finger is lifted, the zoom level stays where it is. When the first finger is lifted, the zoom returns to the zoom level before the gesture began.

20 Claims, 9 Drawing Sheets

(56) References Cited

U.S. PATENT DOCUMENTS

| | | | |
|---|---|---|---|
| 2008/0259041 A1* | 10/2008 | Blumenberg | G06F 3/04842 345/173 |
| 2009/0164937 A1* | 6/2009 | Alviar | G06F 3/03547 715/800 |
| 2011/0102464 A1* | 5/2011 | Godavari | G06F 3/0416 345/650 |
| 2012/0050336 A1* | 3/2012 | Nave | G06F 3/0488 345/667 |
| 2012/0169776 A1 | 7/2012 | Rissa et al. | |
| 2013/0042199 A1* | 2/2013 | Fong | G06F 3/0488 715/780 |
| 2013/0152024 A1 | 6/2013 | Liang et al. | |
| 2013/0321268 A1 | 12/2013 | Tuck et al. | |
| 2014/0104210 A1 | 4/2014 | Kim et al. | |
| 2014/0109017 A1* | 4/2014 | Benko | G06F 3/0488 715/858 |
| 2014/0189579 A1 | 7/2014 | Rimon et al. | |
| 2014/0189605 A1 | 7/2014 | Helfman | |
| 2014/0191986 A1 | 7/2014 | Kim et al. | |
| 2014/0285507 A1 | 9/2014 | Sato et al. | |
| 2014/0344766 A1* | 11/2014 | Cao | G06F 3/017 715/863 |
| 2015/0143273 A1* | 5/2015 | Bernstein | G06F 3/0488 715/767 |
| 2015/0145782 A1 | 5/2015 | Brown et al. | |

\* cited by examiner

SECOND TOUCH ZOOM CONTROL

CROSS-REFERENCE TO RELATED APPLICATIONS

This utility patent application claims priority from U.S. provisional patent application Ser. No. 62/416,201, filed Nov. 2, 2016, titled "Second Touch Zoom Control", naming inventor Michael S. Morton.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2017 Onshape Inc.

BACKGROUND

Field of Technology

This disclosure relates to graphical user interfaces in computer software, and more specifically to zoom controls in touch-screen displays.

Background

Pinch-zoom is a feature commonly part of touch screen control. Under typical situations, it requires two fingers to touch a screen at approximately the same time, indicating a zoom is desired, and then adjusts the zoom based on the fingers moving together or further apart. With pinch-zoom, the zoom is typically centered on a midpoint between the two fingers. In situations where one finger is already touching the screen, such as part of a one-finger gesture or controlling an on-screen visual, touching with a second finger typically does not trigger the pinch-zoom control, as that control would separate the first finger from the control/action already in progress.

Description of Prior Art

U.S. Pat. App. Pub. No. 2014/0189579 "SYSTEM AND METHOD FOR CONTROLLING ZOOMING AND/OR SCROLLING" (RIMON et al., 2014 Jul. 3) discloses, in the Abstract, "The present invention is aimed at a system and a method for instructing a computing device to perform zooming actions, for example on a picture (enlarging and reducing the size of a virtual object on a display) and scrolling actions (e.g. sliding text, images, or video across a display, vertically or horizontally) in an intuitive way, by using a controller which can detect the distance between an object (e.g. the user's finger) and a surface defined by a sensing system."

None of the above existing solutions provide a touch-screen zoom control involving two-fingers or touch points that allows zooming while maintaining control of a displayed selection or selection point at one of the finger or touch points. What is needed, therefore, is a control that overcomes the above-mentioned limitations and that includes such above-mentioned features.

BRIEF SUMMARY

The solution is a second touch zoom control. A first finger touch to a touch screen establishes a hot spot, selection, or one-finger gesture. Before the first finger is lifted from the touch screen, a second finger is placed on the screen and serves as a zoom control.

- Dragging the second finger away from the first zooms in; toward the first zooms out.
- Dragging the first finger does not affect the zoom, even if the motion changes the difference between the two fingers (this is not a traditional pinch-zoom).
- When the second finger is lifted, the zoom level stays where it is.
- When the first finger is lifted, the zoom returns (may be animated) to the zoom level before the gesture began.
- Repeat lifting and retouching with the second finger allows further zoom in (or out).
- Zoom always keeps the original finger location where it was when the second finger contact initiated, so anything highlighted/selected thing won't change because of a zoom.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION, INCLUDING THE PREFERRED EMBODIMENT

Terminology

The terminology and definitions of the prior art are not necessarily consistent with the terminology and definitions of the current invention. Where there is a conflict, the following definitions apply.

A hot spot is a location, within a displayed screen, corresponding to a touch event location. In cases of selectable items, such as on-screen icons, the hot spot may be the selected item if such exists at the touch event location.

Operation

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present invention.

Users interacting with a software application using a touchscreen sometimes want magnified views, and desire to control the exact display or selection while adjusting the zoom level. Traditional pinch-zoom requires two finger control of the zoom, preventing simultaneous control of a selection or movement within the display while adjusting the zoom. A solution to this problem is a second touch zoom control. Such zoom control may be implemented as software within an underlying platform, or operating system, as part of a touch-screen specific driver, as part of a specific application, or as a separate application able to intercept touch events and alter touchscreen functionality for any set of applications.

The second touch zoom control may be configured at a system level (such as a system setting in the operating system running on the device) or at an application level (within an application running on the operating system running on the device), and may be pre-configured and fixed or dynamically configurable by any user or restricted to configuration by an authorized user.

During operation of second touch zoom, a computer processor of the device operates software code to identify and distinguish between the first and second touches, calculate movement of either touch and appropriate zoom and center point for such zoom. The software may be part of a running application or part of an operating system stored and run on the device.

Figure 1:
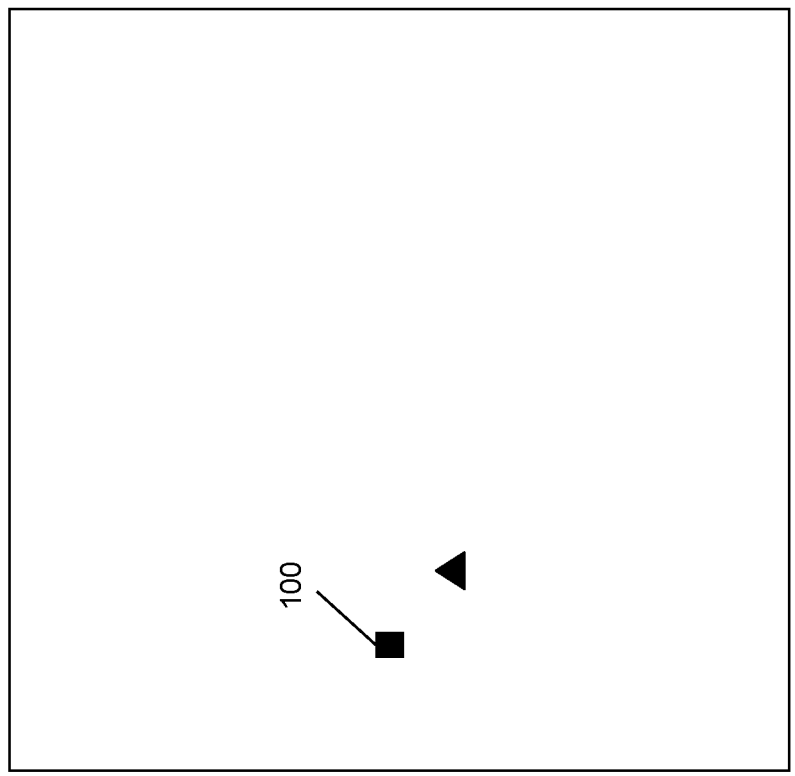
FIG. 1 shows an example touchscreen device interface with two selectable objects.
Figure 2:
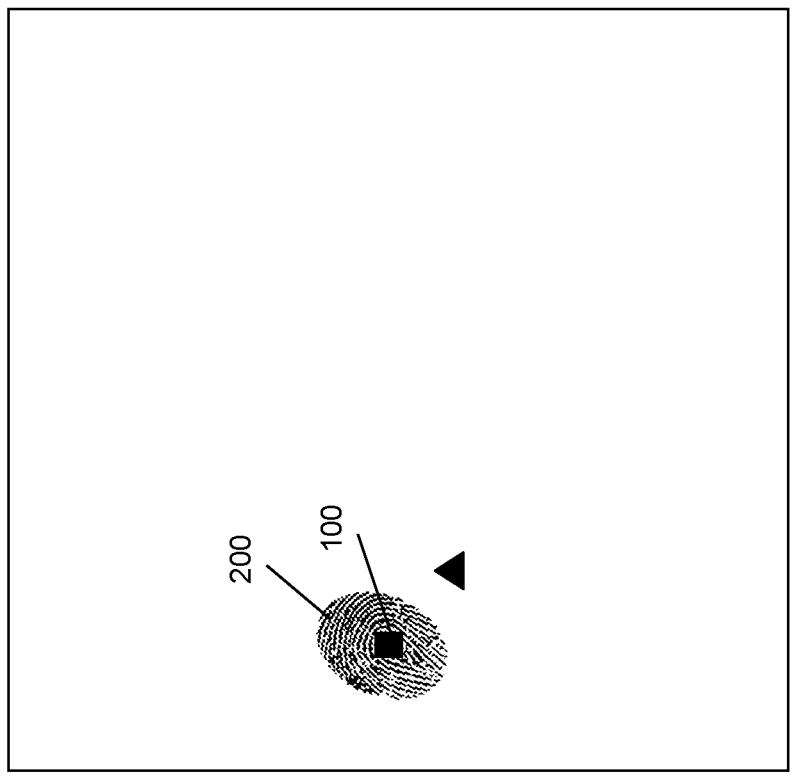
FIG. 2 shows the example touchscreen interface of FIG. 1 with a first finger touching the square object.
Figure 3:
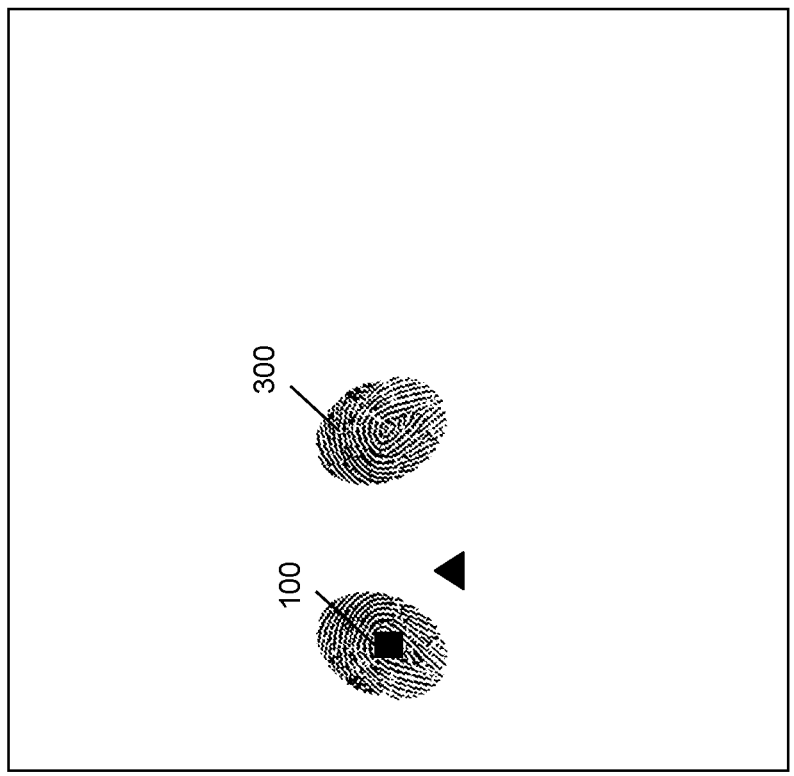
FIG. 3 shows the example touchscreen interface of FIG. 2 with a second finger touching the screen.
Figure 4:
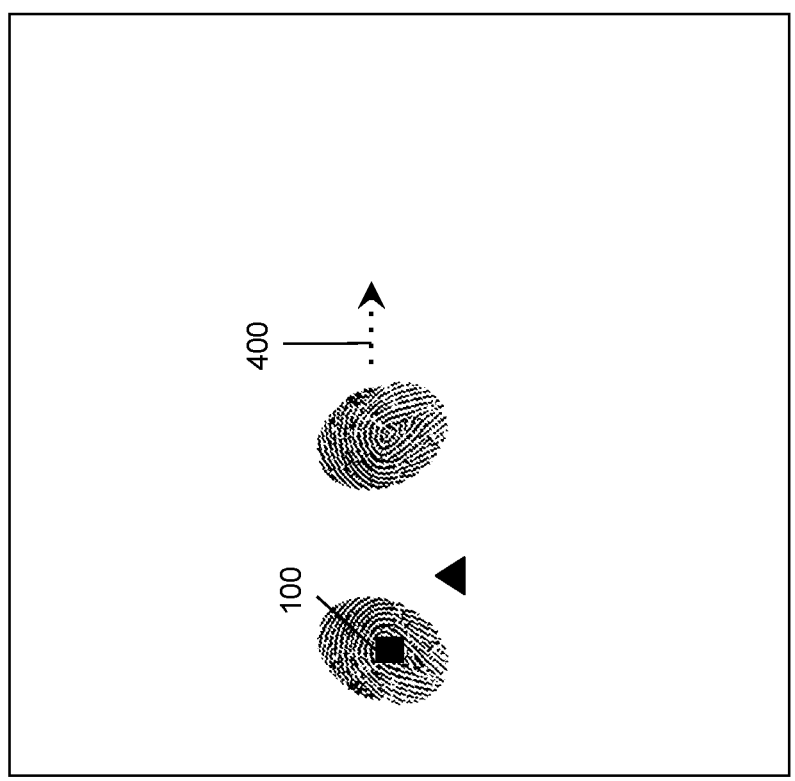
FIG. 4 shows the example touchscreen interface of FIG. 3 with a movement direction indicated for the second finger.
Figure 5:
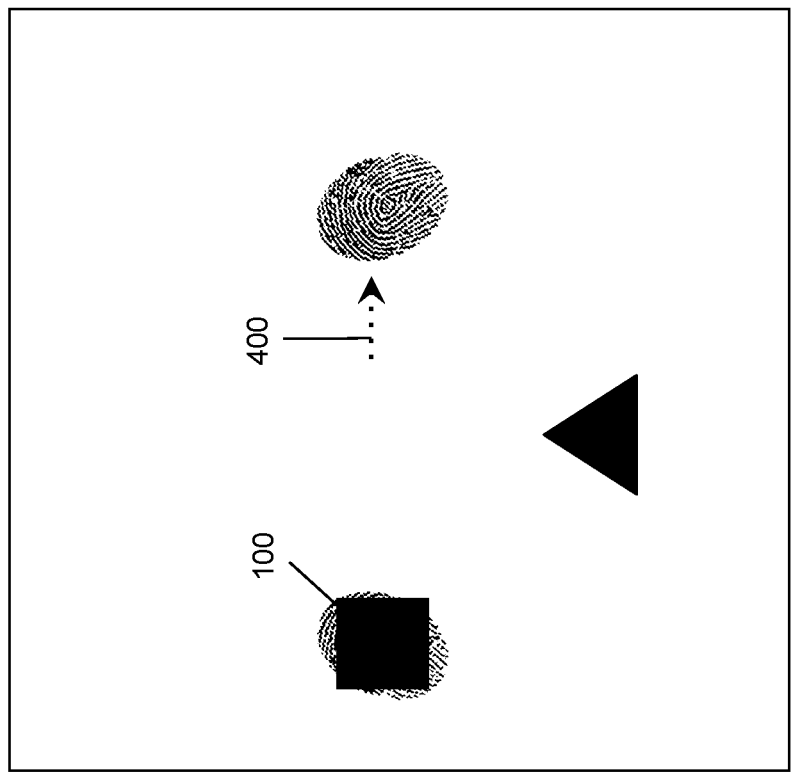
FIG. 5 shows the example touchscreen interface of FIG. 4 with the resulting zoom due to movement as indicated of the second finger, with the zoom centered around the location of the first finger.
Figure 6:
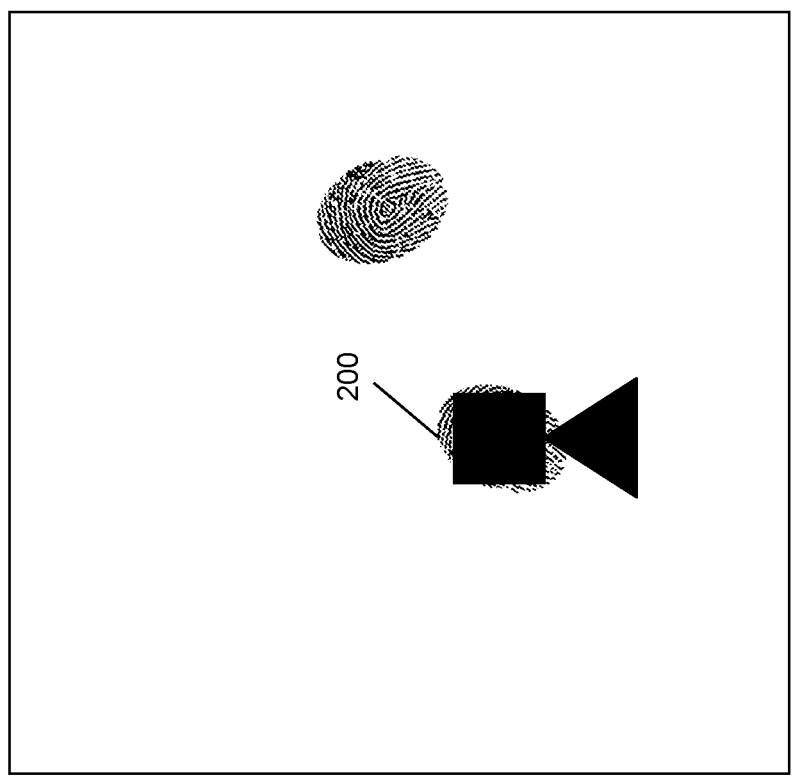
FIG. 6 shows the example touchscreen interface of FIG. 5 with a movement of the first finger.
Figure 7:
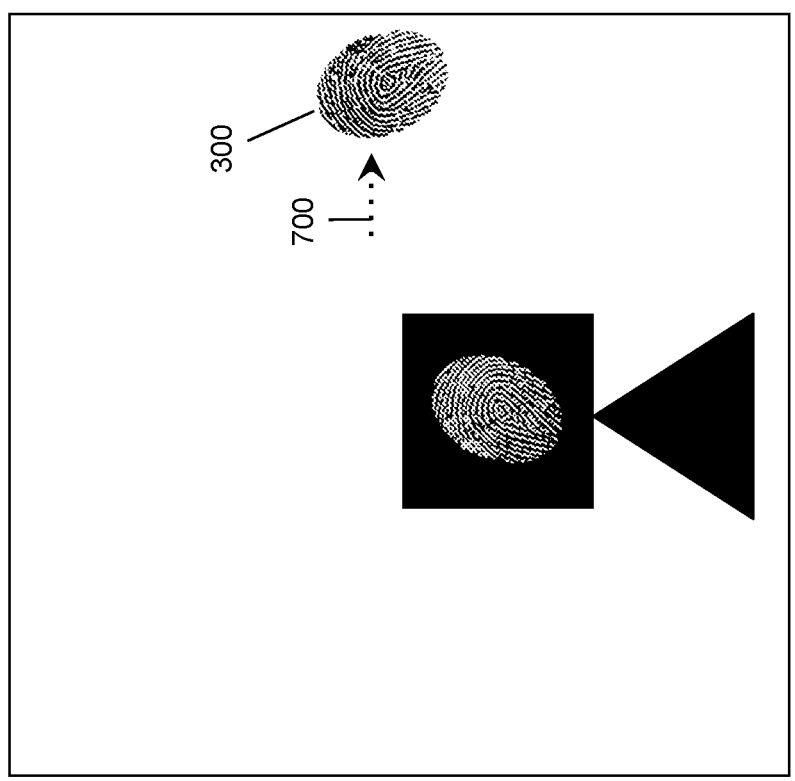
FIG. 7 shows the example touchscreen interface of FIG. 6 with additional movement of the second finger and resulting zoom.
Figure 8:
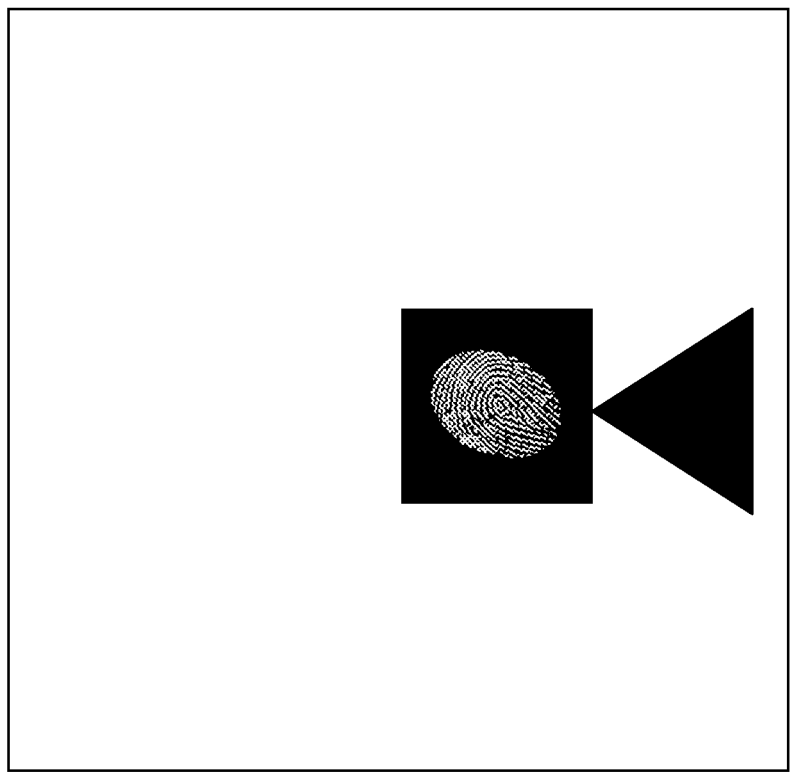
FIG. 8 shows the example touchscreen interface of FIG. 7 with the second finger lifted from the touchscreen.
Figure 9:
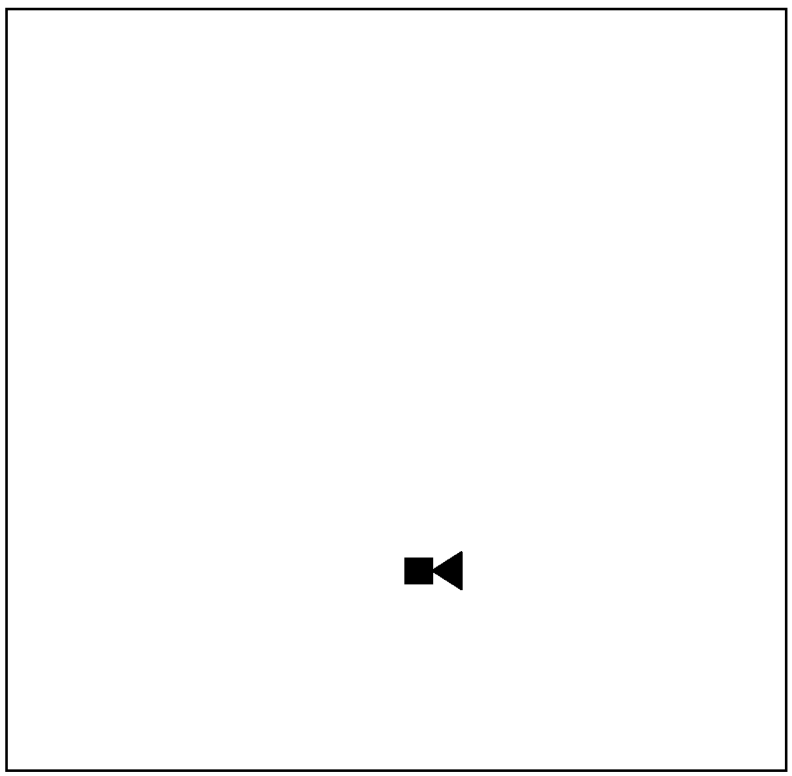
FIG. 9 shows the example touchscreen interface of FIG. 8 with the first finger lifted from the touchscreen.

Referring to FIGS. 1 & 2, prior to a second touch controlling zoom, a user of a touchscreen computing device makes a first touch 200 with a first finger to the touchscreen. The first touch may be to make a selection such as of an on-screen object 100, control scroll of what is displayed on the screen, be initiation of a single finger gesture, or for any other reason. Referring also to FIG. 3, before the first finger is raised from the screen, a second finger touch 300 to the screen may control zoom. The second touch, initiated while the first touch is still in contact with the touchscreen, may activate zoom control. Referring also to FIGS. 4 & 5, movement of the second finger may control zoom level. Moving the second finger away 400 from the first finger zooms in the display, while moving the second finger towards the first finger zooms out the display. The display, throughout the zoom action, is centered around the first touch such that any selection or point 100 at the first touch remains at the first touch location during and after the zoom control action. Referring also to FIG. 6, moving the first finger 200 has no impact on zoom level, but operates user interface control, such as selection of the first item, in the same manner as would occur prior to initiating the second touch zoom control. Referring also to FIG. 7, further movement 700 of the second finger 300 further alters zoom level. Referring also to FIG. 8, lifting the second finger from the touch screen may end zoom control and leave the display at the current level of zoom. Initiating an additional touch with the second finger enables further second-finger zoom control adjustments. Referring also to FIG. 9, lifting the first finger and ending the first touch event reverts zoom to the original zoom level.

In the preferred embodiment, the zoom factor may be a linear function of the ratio of current-to-starting finger distance. In other words, if a second finger touches 100 pixels away from the first and drags to 200 pixels away, the screen zooms toward the user by a factor of 2 (=200/100). If the second finger instead moved towards the first finger, the same zoom factor as a ratio of distance moved may be used to zoom out the display. Movement direction, relative to the first finger touch point, controls the direction of zoom (in or out), while the zooming factor is determined by distance between the current second touch point and the initial second touch point.

The second touch zoom control may be implemented on any device using a touch-screen display. Examples include, but are not limited to, smart phones, tablets, and touchscreens connected to desktop computers. Implementation may be through software running on a computer processor of the device using the touch-screen display, and run as part of specific software applications or including within operating system software. Implementation may be written in any of several widely available programming languages, and may be coded as a subroutine, module, subsystem, or object depending on the language and environment. Software includes computer program instructions and may be stored on any non-transitory computer-readable medium accessible, directly or indirectly, by a computer processor of the device. In a server-client architecture, software may be stored on and executed from a server or a client or any combination of server and client. Implementation may also be in hardware as part of the computer or graphics processor.

Other Embodiments

The first and second touch events which are part of second touch zoom control are typically first and second finger touch events to the touch-screen device. However, certain touch-screens accept or work with alternative touch controls to finger touches, such as a touch screen stylus pen. Such alternative control may be used for either or both touch events in the same fashion as the finger touches for second touch zoom control.

In an alternate embodiment, the second finger zoom control may also include an offset slide. In many cases, it is desirable to see the screen area directly under the first finger touch, but this is obscured (even while zoomed) by the first finger. To account for this, the initial second finger movement may, in addition to zoom control, slide or offset the entire display.

The purpose of the slide is not to enable full drag controls, which creates issues with zooming and maintaining a first touch location. Instead, the slide or offset may be by a fixed amount. That amount may be configurable on an application or system level, or may be determined at the time of initial second finger movement based on the size of contact at the first finger touch. Touchscreen touch detection generally has API commands allowing determination of a contact patch, or width of the actual touch being made with a screen. Based on this width, an offset may be determined, such as a small slide for a small finger (or stylus, if used in place of a finger), and a larger slide for a larger finger or touch area.

The direction of slide (movement of the screen display), may also be configured at a system or application level. One configurable option is to slide the fixed amount in the direction of the second finger, either to where the second finger touch initiated or ended (after a first slide of the second finger). This option allows user control of the slide direction. Another option is to drag the fixed amount towards the screen center from the first finger touch location. This option ensures that the finger-obscured location moves in a direction to be visible (towards the middle of the screen, instead of towards an edge), but removes user control over which way the slide occurs.

After a slide, the first touch hotspot is offset by the distance and direction of the slide. In other words, the first finger is now operating as if it has an invisible stylus attached, acting some pixel distance from where the finger touches. All movements of the first finger retain this offset until the first finger is lifted from the screen.

When the first finger is lifted, any slide or offset is returned, as with the zoom level, to the original starting point. For ease of recognition, animation effects may be added during this return.

In another alternative, the zoom factor may be adjusted. This may be preconfigured, or configurable at a system or application level. The zoom factor may be linear based on the distance the second finger has moved, but adjusted by a fixed multiplier. The zoom factor may also be non-linear. For example, the zoom factor may be a power of the distance the second finger has moved. The zoom factor might be the distance moved squared to allow power users to quickly zoom by a large amount, or the zoom factor might be the square root of distance moved to allow very precise tuning of the amount of zoom. Any other exponent greater than zero may be used as well. With such exponential zoom, a user interface to select the specific zoom factor rate may be used, such as popping-up a configuration menu when the second finger remains stationary for a specific period of time (for example, greater than 3 seconds), allowing user selection with the second finger of the specific exponent to control the zoom.

The zoom factor may also be clamped to a limit to prevent accidentally zooming too much in either direction. This may be especially important if the second finger's starting or ending position is near the first finger's hotspot and the ratio is nearly (0/something) or (something/0). Such limit may be pre-configured, or configurable at a system or application level. Clamping may also be graduated, such that zooming slows as the zoom factor approaches the limit.

Other nonlinear functions or mappings to determine the zoom factor may be used, and may be configurable on an application or system-wide basis.

Another alternative clamping is to limit the maximum zoom factor per touch of the second finger. This limits the maximum zoom of a single movement of the second finger, but greater zoom is possible by lifting and retouching with the second finger as zoom level does not change when the second finger is lifted, and may be further adjusted with additional second finger touches. Such limit may be configurable at a system or application level.

Each alternative embodiment may be implemented separately or in conjunction with the other alternative embodiments as well as the preferred embodiment. All configurable aspects may be set by a user interface settings control, by an application through interaction with an API, or through a file or other value store which may be updated by a user, administrator, or other program.

It is to be understood that the above description is intended to be illustrative, and not restrictive. Many other embodiments will be apparent to those of skill in the art upon reviewing the above description. The scope of invention should, therefore, be determined with reference to the appended claims, along with the full scope of equivalents to which such claims are entitled.

What is claimed is:

1. A method of touch screen zoom control, comprising:
   establishing a hot spot through a first touch to a touch screen display;
   detecting a second touch on the touchscreen display;
   zooming the display in on movement of the second touch location away from the hot spot;
   zooming the display out on movement of the second touch location towards the hot spot;
   centering all zoom actions on the hot spot such that the hot spot location remains at the location of the first touch;
   maintaining zoom at a current zoom level in response to contact of the second touch being removed from the display;
   after detecting the second touch and while the first touch remains in contact with the display, operating dragging movement of the first touch location without impacting zoom level; and
   reverting zoom to an original zoom level equivalent to the display prior to any zoom in or zoom out actions in response to contact of the first touch being removed from the display.

2. The method of claim 1, further comprising moving the hot spot location with movements of the first touch location without altering zoom.

3. The method of claim 1, further comprising maintaining the hot spot location at an initial location of the first touch if the location of the first touch moves.

4. The method of claim 1, wherein zooming the display in and zooming the display out alters a zoom factor based on a liner function of a ratio or distance between a current position of the second touch and an initial position of the second touch.

5. The method of claim 1, wherein zooming the display in and zooming the display out alters a zoom factor based on a non-linear exponential function of a ratio or distance between a current position of the second touch and an initial position of the second touch.

6. The method of claim 5, further comprising displaying a selection window after the location of the second touch has remained unchanged for a preconfigured period of time, and basing the exponent used when altering zoom factor based on a selection from the selection window.

7. The method of claim 5, further comprising clamping the zoom factor to a preconfigured limit as the ratio approaches zero or infinity.

8. The method of claim 7, further comprising graduating the clamping as the zoom factor approaches the limit.

9. The method of claim 5, further comprising limiting a maximum zoom factor.

10. The method of claim 9, further comprising increasing the maximum zoom factor every time contact of the second touch is removed an reapplied to the display.

11. A touch-screen display connected to a computer device, the computer device accessing at least one non-transitory computer-readable medium containing computer program instructions, wherein the computer program instructions are executable by at least one computer processor of the computer device to perform a method of controlling zoom on the touch-screen display, the method comprising:
    establishing a hot spot through detecting a first touch to a touch screen display;
    detecting a second touch on the touchscreen display;
    zooming the display in on movement of the second touch location away from the hot spot;
    zooming the display out on movement of the second touch location towards the hot spot;
    centering all zoom actions on the hot spot such that the hot spot location remains at the location of the first touch;

maintaining zoom at a current zoom level in response to contact of the second touch being removed from the display;

after detecting the second touch and while the first touch remains in contact with the display, operating dragging movement of the first touch location without impacting zoom level; and reverting zoom to an original zoom level equivalent to the display prior to any zoom in or zoom out actions in response to contact of the first touch being removed from the display.

12. The device of claim 11, wherein the method further comprises moving the hot spot location with movements of the first touch location without altering zoom.

13. The device of claim 11, wherein the method further comprises maintaining the hot spot location at an initial location of the first touch if the location of the first touch moves.

14. The device of claim 11, wherein zooming the display in and zooming the display out alters a zoom factor based on a liner function of a ratio or distance between a current position of the second touch and an initial position of the second touch.

15. The device of claim 11, wherein zooming the display in and zooming the display out alters a zoom factor based on a non-linear exponential function of a ratio or distance between a current position of the second touch and an initial position of the second touch.

16. The device of claim 15, wherein the method further comprises displaying a selection window after the location of the second touch has remained unchanged for a preconfigured period of time, and basing the exponent used when altering zoom factor based on a selection from the selection window.

17. The device of claim 15, wherein the method further comprises clamping the zoom factor to a preconfigured limit as the ratio approaches zero or infinity.

18. The device of claim 17, wherein the method further comprises graduating the clamping as the zoom factor approaches the limit.

19. The device of claim 15, wherein the method further comprises limiting a maximum zoom factor.

20. The device of claim 19, wherein the method further comprises increasing the maximum zoom factor every time contact of the second touch is removed an reapplied to the display.

* * * * *